(12) United States Patent
Joshi (10) Patent No.: US 12,341,774 B2
(45) Date of Patent: Jun. 24, 2025

(54) PROCESS LEVEL AUTHENTICATION FOR CLIENT DEVICE ACCESS TO A SERVER SYSTEM

(71) Applicant: Arbor Networks, Inc., Westford, MA (US)

(72) Inventor: Amogh N. Joshi, Pune (IN)

( * ) Notice: Subject to any disclaimer, the term of this patent is extended or adjusted under 35 U.S.C. 154(b) by 318 days.

(21) Appl. No.: 17/866,865

(22) Filed: Jul. 18, 2022

(65) Prior Publication Data

US 2023/0370455 A1 Nov. 16, 2023

(30) Foreign Application Priority Data

May 13, 2022 (IN) .............................. 202211027593

(51) Int. Cl.
  *H04L 29/00* (2006.01)
  *G06F 9/54* (2006.01)
  *H04L 9/40* (2022.01)
  *H04L 67/133* (2022.01)

(52) U.S. Cl.
  CPC .......... *H04L 63/0876* (2013.01); *G06F 9/547* (2013.01); *H04L 63/10* (2013.01); *H04L 63/123* (2013.01); *H04L 67/133* (2022.05)

(58) Field of Classification Search
  CPC ... H04L 63/0876; H04L 67/133; H04L 63/10; H04L 63/123; G06F 9/547

USPC ............................................................. 726/4
See application file for complete search history.

(56) References Cited

U.S. PATENT DOCUMENTS

| 7,778,260 B2 * | 8/2010 | Sturniolo | H04W 8/02 370/310 |
| 2018/0144124 A1 * | 5/2018 | Lahav | H04L 9/3242 |
| 2021/0288953 A1 * | 9/2021 | Valecha | H04L 9/3226 |

* cited by examiner

*Primary Examiner* — Brandon Hoffman
*Assistant Examiner* — Michael D Anderson (57) ABSTRACT

An authenticating method including storing internally a reference hash set having hashes of genuine client binary and/or library files. The method further includes receiving an authentication request for authentication of the client process to authorize the client process to access a server resource provided by the server process. In a first phase, the method further includes requesting from the client OS, the process details and the hashes of the client binary and/or library files and verifying (using the reference hash set) these hashes received. In a second phase the method further includes, contingent on positive verification in the first phase, transmitting a random message to the client process by locating it using the IP address and PID presented during the authentication request, verifying a copy of the random message received back from the client process, and contingent on positive verification in the second phase, allowing the client process to access the requested server resource.

22 Claims, 6 Drawing Sheets

PROCESS LEVEL AUTHENTICATION FOR CLIENT DEVICE ACCESS TO A SERVER SYSTEM

This Application claims priority to application No. IN202211027593 filed on May 13, 2022 in India. The entire contents of this application is incorporated herein by reference in its entirety.

BACKGROUND

1. Field of the Disclosure

The present disclosure relates to security for client/server communications, and more particularly to process level authentication for client device access to a server system.

2. Description of Related Art

Client/server communications can include a client process installed on a client device accessing a server system for obtaining information stored by the server system or for accessing a service provided by the server system. Security is provided for these client/server communications to prevent access to the server system by unwanted client processes, including by malicious actors.

Some methods for providing security include an exchange of sensitive information, such as an application programming interface (API) key, password, information required by a security policy, etc. The sensitive information can be stored in an external system, such as a database, a key value store or any other systems, referred to herein as a data store.

Some existing protection techniques include data encryption (at rest or on wire), a firewall that protects from access by unwanted entities, signed binary files (that can be verified within the scope of certain environments, such as a java virtual machine (JVM) (a platform-independent execution environment) or .NET Framework (a managed execution environment).

These techniques have inherent weaknesses. When encryption is used, it is a fair assumption that a process executing on an unwanted client device will not obtain access to the encryption key and hence will not gain access to the sensitive information. With a firewall is used, it is fair assumption that a process executing on an unwanted client device, cannot reach the server and hence cannot gain access the sensitive information. Signed binary files are not effective in preventing a process operating outside of the JVM or .NET framework environments from accessing the sensitive information. A combination of these techniques can reduce the risk of unwanted access to sensitive information.

However, these protection techniques would not be effective if a foreign process gained access to a trusted client device. The foreign process could then gain access to encryption keys and access to the sensitive information. The firewall rules too would not block the foreign process from accessing the sensitive information from the server. The problem can worsen in a compromised environment in which an adversary has gained control over a trusted client device.

Human interactions can further degrade effectiveness of the protection techniques. For example, in one scenario, a person or tool may accidentally change firewall rules. In another scenario, a person may unknowingly leak an encryption key that is stored at an external location.

While conventional methods and systems have generally been considered satisfactory for their intended purpose, there is still a need in the art for a system and method to authenticate a client process by a server process without relying on information stored at an external location. This disclosure provides a solution for the need.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method of authenticating a client process to access a server process. The method includes storing internally a reference hash set, wherein the reference hash set includes hashes of client binary files, and the client binary files include executable files for execution of the client process and/or library files loaded by the client process. The method further includes receiving the authentication request for authentication of the client process to authorize the client process to access a server resource provided by the server process. A first phase of the method includes requesting from the client device (a) process details for accessing the client binary files loaded by the client process and (b) calculated hashes of these client binary files. The first phase of the method further includes verifying, using the reference hash set, the calculated hashes received from the client device in response to the request. A second phase of the method includes, contingent on positive verification in the first phase, transmitting a random message to the client process, verifying a copy of the random message received back from the client process, and contingent on positive verification in the second phase, allowing the client process to access the requested server resource.

In one or more embodiments, the authentication request, communications exchanged during the first phase, and communications exchanged during the second phase can be transmitted using first and second different channels.

In one or more embodiments, the authentication request can include a process identifier (PID) of the client process and the internet protocol (IP) address of the client device hosting the client process can be sent by the first channel via a network connection. The PID can be assigned by an operating system of the client device, and the communications exchanged in the first phase can be transmitted by the second channel using remote procedure call (RPC) communication.

In one or more embodiments, the communications exchanged in the first phase can include (a) transmission of a first RPC request to the client device, wherein the first RPC request can request the process details for the client process identified by the PID and (b) receipt of a first RPC response in response to the first RPC request from the client device, wherein the first RPC response can include the process details for the client process identified by the PID. For making the RPC requests, the client device is identified by the IP address available in the authentication request.

In one or more embodiments, the process details can include locations of the respective client binary files configured to be loaded by the client process, and the communications exchanged in the first phase can further include (c) transmission of a second RPC request to the client device, wherein the second RPC request can include one or more of the locations included in the process details that were retrieved from the first RPC response and can instruct the client device to respond with calculated hashes of the client binary files accessible at the one or more locations and (d) receipt of a second RPC response in response to the second RPC request from the client device, wherein the second RPC response can include the calculated hashes that were requested.

In one or more embodiments, transmitting in the second phase can include transmitting by the second channel a third RPC request to the client process, using the IP address of client device and the PID of the client process, wherein the third RPC request can include the random message as generated by a randomization algorithm. The second phase can further include storing the random message and receiving, via the authentication channel, a copy of the random message. Verifying the copy of the random message in the second phase can include matching it against the stored random message.

In one or more embodiments, the received copy of the random message can be encoded, wherein the method can further include decoding this copy before the verifying in the second phase.

In accordance with another aspect of the disclosure, a method is disclosed for authenticating a client process to access a server process. The method includes submitting the authentication request for authentication of the client process to authorize the client process to access a server resource provided by the server process. The method further includes, in a first phase, receiving by a client device hosting the client process first requests from a server system hosting the server process for (a) client process details for accessing client binary files of the client process and (b) calculated hashes of the client binary files. The client binary files include executable files for execution of the client process and/or library files loaded by the client process. The method further includes, in the first phase, providing by the client device the process details and the calculated hashes of the client binary files as per the process details in response to the first requests. The method further includes, in a second phase, contingent on positive verification by the server system of the calculated hashes provided in the first phase, receiving by the client device a second request from the server system, wherein the second request includes a random message, and responding by the client process to the second request with a copy of the random message received. Contingent on positive verification by the server system of the copy of the random message, the client process gains access to the requested server resource.

In one or more embodiments, the authentication request, communications exchanged during the first phase, and communications exchanged during the second phase can be transmitted using first and second different channels.

In one or more embodiments, the authentication request can include a process identifier (PID) of the client process and the IP address of the client device, and the authentication request can be sent by the first channel via a network connection. The PID can be assigned by an operating system of the client device, and the communications exchanged in the first phase can be transmitted by the second channel using remote procedure call (RPC) communication.

In one or more embodiments, the communications exchanged in the first phase can include receipt of a first RPC request from the server system, wherein the first RPC request can request the process details for the client process identified by the PID. The communications in the first phase can further include transmission of a first RPC response in response to the first RPC request, wherein the first RPC response can include the process details for the client process identified by the PID.

In one or more embodiments, the process details can include locations of the respective client binary files configured to be loaded for execution of the client process. The communications exchanged in the first phase can further include receipt of a second RPC request from the system server, wherein the second RPC request can include one or more of the locations included in the process details that were provided in the first RPC response, and can instruct the client device to respond with calculated hashes of the client binary files accessible at the one or more locations. The communications exchanged in the first phase can further include transmission to the server system of a second RPC response in response to the second RPC request, wherein the second RPC response can include the calculated hashes that were requested. The method can further include locating the client binary files using the one or more locations included in the second RPC request and calculating the hashes of the located client binary files. Positive verification of the calculated hashes can include verification of the calculated hashes relative to a reference hash set previously stored by the server system.

In one or more embodiments, receiving the second request in the second phase can include receiving by the second channel from the system server a third RPC request that includes the random message and the PID. Responding to the second request in the second phase can further include transmitting to the server system via the authentication channel, by the client process identified by the PID included in the third RPC request, the copy of the random message included in the third RPC request. Positive verification of the copy of the random message can include verification by the server system that content of the received copy of the random message matches the random message that was included in the third RPC request.

In one or more embodiments, the method can further include encoding content of the RPC response.

In accordance with further aspects of the disclosure, computer systems are provided that performs each of the respective disclosed methods. In accordance with still further aspects of the disclosure non-transitory computer readable storage mediums and one or more computer programs embedded therein are provided, which when executed by a computer system, cause the computer system to perform the respective disclosed methods.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
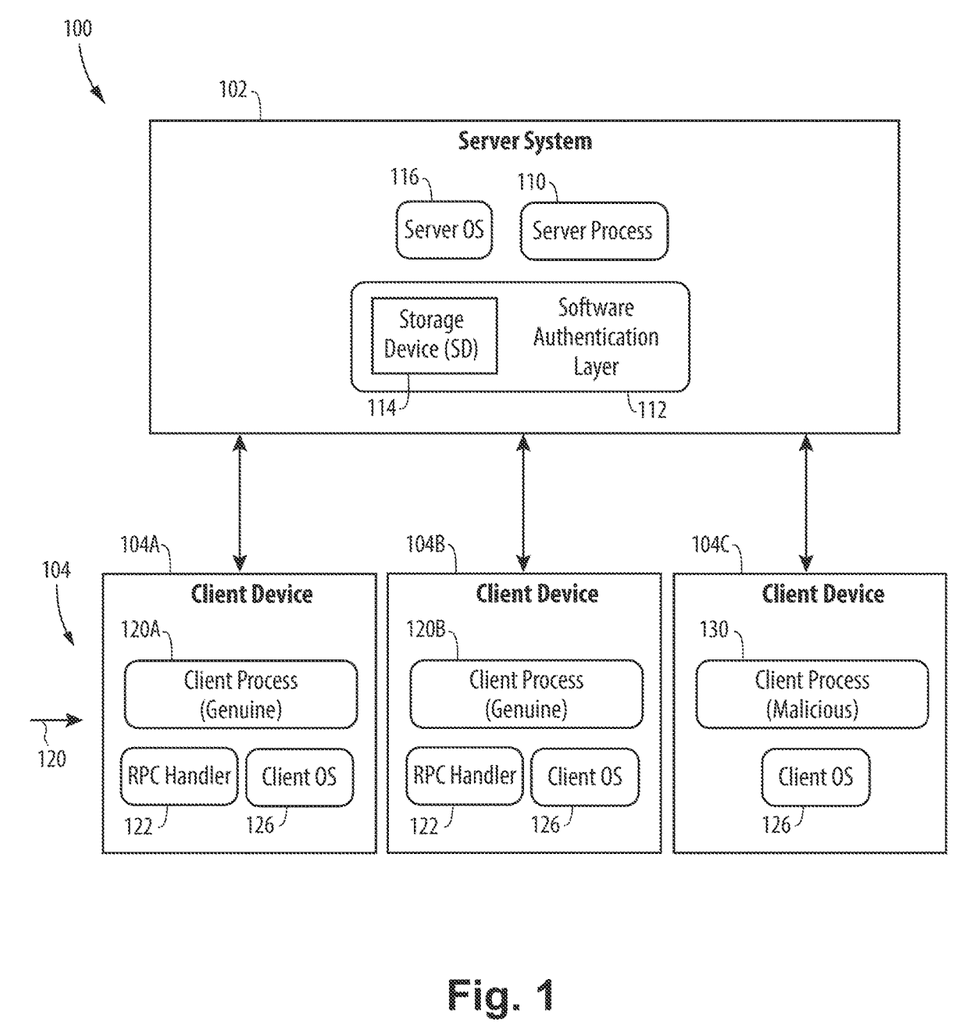
FIG. 1 illustrates a block diagram of an example network system having an example client process hosted by a client device that requests access to an example server process hosted by a server system, in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network system 100 in accordance with the disclosure is shown in FIG. 1 and is designated generally by reference character 100. Methods associated with monitoring operations associated with a protected network of the network system 100 in accordance with the disclosure, or aspects thereof, are provided in FIGS. 2A-5, as will be described. The systems and methods described herein can be used to authenticate a client process hosted by a client device before allowing access to a server process hosted by a server system, wherein the authentication is performed without relying on information stored at an external location.

With reference now to FIG. 1, network system 100 includes a server system 102 and one or more client devices 104. Three client devices 104A-104C are shown, without limiting the disclosure to a particular number of client devices 104. Client devices 104 can request access to server system 102, such as to access information provided by server process 110 or to access a service provided by server process 110. Information and services provided by server process 110 can involve an exchange of sensitive information that is only intended to be shared with client devices 104 that have been authenticated by an authentication process. The authentication process is intended to prevent access to server system 102 by unauthenticated client devices 104, since unauthenticated client devices 104 can be associated with malicious and/or unknown actors and/or related systems.

Server system 102 includes a processing system (see processing system 500 in FIG. 5) that hosts one or more server processes 110 and a server OS 116. Server system 102 can be any type of server that receives and processes client requests, such as a web server, application server, audio/video server, email server, banking server, file transfer protocol (FTP) server, database server, virtual server, etc., without limitation to a particular type of server. The server process 110 as hosted can execute on the processing system of server system 102.

A server authentication layer (SAL) 112 is provided that theoretically surrounds server system 102 by performing an authentication process that only allows access to server system 102 by a client device 104 that has been authenticated. SAL 112 can be external to or included within server process 110. When included within server system 102, SAL 112 can be provided, for example, as a plugin. All requests by a client device 104 for accessing server system 102 are handled by SAL 112. SAL 112 can permanently and/or temporarily store information in a storage device 114 for implementing the authentication process. Storage device 114 can includes nonvolatile memory, and can further include nonvolatile memory, which can optionally include cache memory. Storage device 114 is shown internal to SAL 114, but can be included in server system 102 external to SAL 112. SAL 112 can include a server-side RPC handler is built in to and interacts with server OS 116 to manage RPC communications as described further below. SAL 112 can further prevent any communication with any client process that is not authenticated.

Client device 104 includes a processing system (see processing system 500 in FIG. 5) that executes one or more client processes 120, an RPC handler 122, and a client OS 126. Client device 104 can be any type of computing device that submits requests to server system 102, such as a mobile device, desktop or laptop device, server, etc., without limitation to a particular type of computing device. The client process 120 can execute on the processing system of client device 104. RPC handler 122 is built in to the client OS 126 for facilitating RPC communication. RPC handler 122 handles RPC communications in conjunction with OS 126, as explained in greater detail below. OS 126 provides conventional operating system functions and supports RPC communication.

In the example shown, client processes 120A and 120B are genuine client processes that can be authenticated by SAL 112. However, client process 130 is a malicious client process operating on client device 104C, wherein client device 104C can be a malicious device or a legitimate device. The malicious client process 130 is bound to be blocked by the authentication process implemented by SAL 112 and to fail when attempting to access server process 110. Only client processes 120 for which a hash verification is successful (by determining that a reference hash set (stored internally by SD 114 during the set-up phase) matches a hash calculated by the client device of client binary files that are configured to be loaded by the client process) are likely to be successfully authenticated.

Client processes 120 and server process 110 are distributed together as a controlled distribution. By the controlled distribution, which is performed by the same vendor, the client binary files for execution of a client process 120 are installed on the hosting client device 104. The client binary files include executable files for execution of the client process and/or library files configured to be loaded by the executable files. In addition, hashes of the client binary files are stored on server 102. The hashes stored on server 102 are referred as the reference hash set for that client process 120. The client binary files for each client process 120 are executable files available for execution of the client process 120.

The reference hash set is stored internally within in server system 102 in the SD 114 such that the reference hash set is accessible by the SAL 112 from the time of installation of server process 110 on server system 102 via the controlled distribution.

A first phase of authentication is initiated by the authentication request by a client process 120. Client process 120 can request access to server process 110 by submitting request to SAL 112 via an authentication channel (for example, web).

During the first phase of the authentication process, before allowing access by a client process 120 to server process 110, SAL 112 locates client binary files that are associated with the client process 120 using RPC calls with support of the server operating system (OS) 116. In response to an RPC request, the client OS 126 responds with process details. The process details provide absolute path(s) to the client binary files, including absolute path(s) to one or more executable files and/or one or more library files loaded by the client process 120. The term "absolute path" (also referred to as "path") as used herein can encompass an absolute location (also referred to as a location) of a file (meaning a binary file or library file of the client process). The path(s) provide a fingerprint of the client process. Using the path(s) provided with the process details, SAL 112 can request hash(es) of client binary file(s) stored by client device 104 at the path(s) indicated. SAL 112 can verify that the hash(es) received from client device 104 match the reference hash set stored in SD 114 for all authenticated client process 120. If the calculated hash(es) do not match the reference hash set, authentication fails. In this manner, the first phase verifies whether the fingerprint of the requesting client process 120 is trusted by the server process 110.

During the second phase of the authentication process, server system 102 sends a random message to client device 104 for the requesting client process 120 to copy and send back via client device 104. If a copy of the random message is not received from client device 104, authentication fails. Until the client process 120 is authenticated, server process 110 does not trust client process 120, rely on any information from client process 120, or provide access by the client process 120 to the server process 110. In this manner, the second phase verifies that the client process 120 for which the fingerprint is verified (in the first phase) is actually the client process 120 requesting authentication or not. This eliminates the possibility of a malicious client process 130 posing as a genuine client process 120 that actually exists somewhere in the network system 100.

Figure 2A:
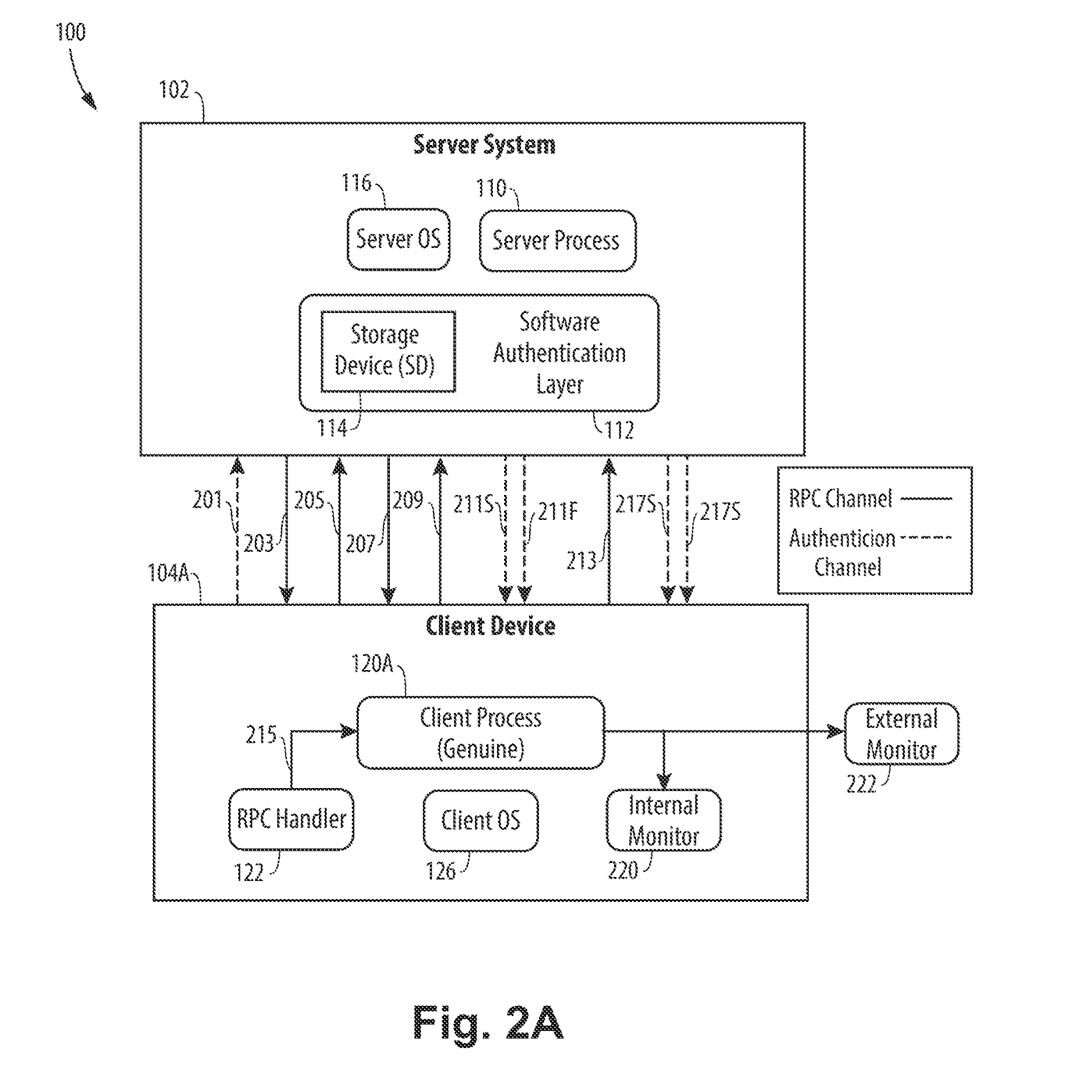
FIG. 2A illustrates a block diagram showing an example communication flow between the client device and server system shown in FIG. 1, in accordance with an aspect of the disclosure.

With reference to FIG. 2A, transmission 201 represents transmission via the authentication channel of the authentication request from client device 104A to access server process 110. In response to this authentication request, server system 102 initiates a handshaking procedure with client device 104. The handshaking procedure includes a series of RPC requests from server OS 116 to client OS 126, with all RPC requests and responses conducted over the RPC channel, wherein the RPC channel is configured for communication that uses an RPC protocol. Transmissions 203, 207, and 213 represent transmissions of the RPC requests. Transmissions 205 and 209 represent transmissions of RPC responses to RPC requests 203 and 207 respectively. RPC handler 122 handles processing of received RPC requests and generation of RPC responses exchanged via transmissions 203, 205, 207, 209, and 213, and further communicates with a client process via transmission 215. In addition, the RPC handler 122 calculates the client binary hash with support of client OS 126. SAL 112 controls the content of the RPC requests and checks whether content of the RPC responses can be verified. Success or failure of the verification during the first phase is provided via authentication channel at transmissions 211S or 211F, respectively. Success or failure of the verification during the second phase is provided via authentication channel at transmissions 217S or 217F, respectively.

Only once successful verification is provided at transmissions 211S and 217S is client process 120A awarded with access to server process 110. RPC is a request-response protocol that conventionally operates similarly to a procedure call. The term RPC is used here as a means to run system commands on a remote device. Any means for RPC can be used, for example, MSRPC and WinRM or even SSH (Secure Shell), without limitation to a particular RPC protocol. In conventional usage of the RPC protocol, an operating system of a remote client, while executing an application that requires a procedure to be performed, sends a request message to the operating system of a known remote server to request the remote server to execute the procedure with parameters supplied by the request. The remote server performs the procedure using the parameters and sends a result of the procedure via a response to the remote client. The remote client can continue executing the application using the result provided by the remote server.

In a nonlimiting example, an RPC call can include a remote client, while executing an application, calling a client stub provided with RPC handler using a local procedure call, with parameters pushed on to a stack in a normal way. The client stub packs the parameters into a request message (also referred to as marshalling) and makes a system call to send the request message. The remote client's local operating system sends (which can be referred to as posting) the request message from the remote client's machine (wherein machine refers to a processing device executing programmable instructions) to a machine of a remote server. An operating system that is local to the remote server's machine passes the incoming packets to a server stub. The server stub unpacks the parameters from the request message (also referred to as unmarshalling). The server stub calls a server procedure and the server procedure applies the parameters. An output from the procedure is marshalled into a reply message.

The remote server's local operating system sends the reply message from the remote server's machine to the remote client's machine. The remote client's local operating system unmarshals the reply message and can use the results from the procedure performed by the remote server in the application that the remote client is executing.

Disclosed is a nonconventional use of RPC communication, namely using RPC communication for authenticating a client process 120 to access a server process 110. The RPC communication is initiated by a server process 110 executing on a remote server system 102 that a client device 104 is attempting to access. Before allowing access to the server process 110, the server system 102 initiates an authentication process that determines whether or not the client device 104 will be granted access to server process 110.

Figure 2B:
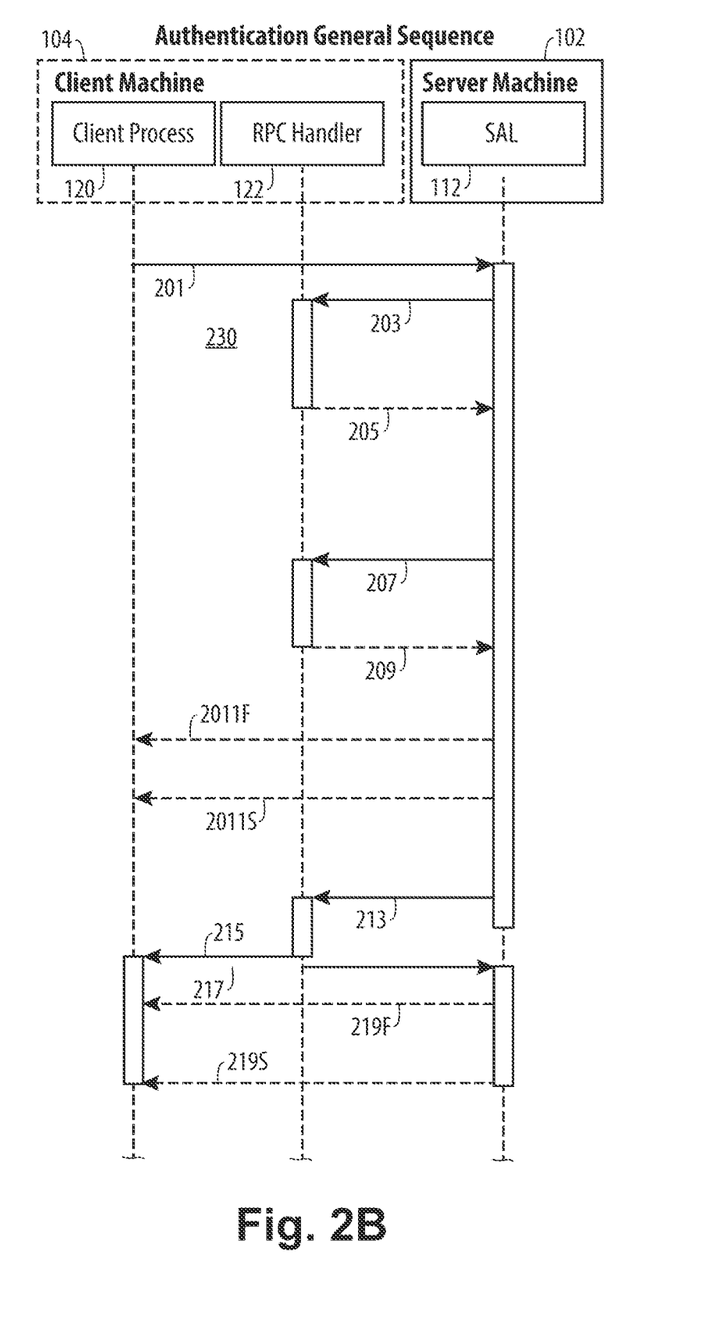
FIG. 2B illustrates a sequence diagram showing an example sequence of communication transmissions between the client device and server system shown in FIG. 1, in accordance with an aspect of the disclosure.

With reference to FIG. 2B, a sequence of transmissions 201-219S between client process 120 and RPC handler 122 and SAL 112 is shown. The sequence of transmissions shown in FIG. 2B proceeds automatically without human intervention. The sequence does not require or use any credential stored on an external entity, such as a disc or other storage device. The sequence of transmissions can be used to authenticate a particular client process 120. Even when client process 120 of a client device 104 is authenticated, other malicious client processes running on the same client device 104 are not authenticated by this sequence of transmissions.

At transmission 201 the authentication request, including the client process' PID and the IP address of the client device, is submitted from client process 120 to server 102 via the authentication channel. Alternatively, the authentication request can skip the IP address and SAL 112 can derive this IP address from the network connection. SAL 112 handles the authentication request by establishing an RPC connection with client process 120 using a unique identification of client process 120, which uses both the client process' PID as provided and the client process's IP address.

In a first phase, at transmission 203, SAL 112 submits a first RPC request for process details for accessing client process 120. All RPC requests and responses to and from client process 120 are via the RPC channel and are handled by client device's 104 RPC handler 122. The process details can include any of a client process command line that can be used to invoke the client process, an absolute path to the client binary files, and/or names of the client binary files. RPC handler 122 fetches the process details directly from client OS 126, without involvement of client process 120. At transmission 205, in a first RPC response the requested process details are provided from RPC handler 122 to SAL 112.

At transmission 207, after analyzing the process details, SAL 112 submits a second RPC request including one or more paths selected from the paths included with the process details. The second RPC requests hashes to be calculated for the client binary files stored at the destination of each of the path(s) included in the second RPC request. RPC handler 122 calculates the hashes of the requested files with the help of client OS 126, and without involvement of client process 120. At transmission 209, in a second RPC response, RPC handler 122 responds to the second RPC request with the requested calculated hashes.

SAL performs hash validation of the second RPC response and either responds with phase 1 validation successful message at transmission 211S or a phase 1 validation failure message at transmission 211F. Transmissions 211S and 211F, which indicate success or failure of authentication in the first phase, are transmitted via the authentication channel. Successful verification of the process details and the hashes can include verification that the calculated hashes in the second RPC response match the reference hash set for this particular client process 120. Successful verification allows the authentication process to continue, whereas failed verification terminates the authentication process.

In a situation in which the client binary files accessed via the requested paths are malicious, not genuine, or are otherwise not known to server process 110, the verification will fail, causing termination of the authentication process. When the verification is successful, it is verified that client process 120 is a genuine client process, since it uses client binary file(s) and libraries that are known to server system 102. The next objective is to verify whether the process running on the client device bearing the presented IP address and bearing the presented PID is actually the same client process that is requesting authentication.

In the second phase, SAL 112 obtains (and stores for future reference) a random number from a randomization algorithm that is executed by server system 102. At transmission 213, SAL 112 submits a third RPC request that includes the random number and PID obtained from the authentication request. Although not shown, RPC handler 122 can respond to the third RPC request with a third RPC response, such as to acknowledge the random number. SAL 112 can then wait for a finite time for a copy of the random message to be received on the authentication channel.

Client OS 126 identifies the client process using the PID included in the third RPC request. At transmission 215, in a communication internal to client device 104, RPC handler 122 posts the random message to the identified client process. At transmission 217, the identified client process transmits via the authentication channel a copy of the random message and the PID of the identified client process.

Upon receiving the copy of the random message, SAL 112 verifies whether the stored random number matches the copy of the random number that was sent via the third RPC request. If the match is verified, SAL 112 sends a phase two validation successful message at transmission 219S, and if the match is not verified, SAL 112 sends a phase two validation failure message at transmission 219F, wherein transmissions 219S and 219F and sent via the authentication channel. In one or more embodiments, the copy of the random message can be encoded and/or encrypted by client device 104. When an encoding or encrypting scheme is applied by the client device 104, the server system 102 uses a corresponding decoding or decrypting scheme to access contents of the authentication requests. The encoding, encrypting, decoding, and/or decrypting schemes can be installed on the server system 102 and client device 104 during the controlled distribution.

In a scenario in which the client process that submitted the authentication request is a malicious client acting as a genuine client, the PID of a genuine client would be presented in the authentication request. In this scenario, it would be the genuine client of the presented PID that would receive the random number via transmission 215, not the malicious client. Phase 2 of the authentication process would fail and the malicious client would not be authenticated. In addition, the genuine client having the presented PID would be aware that a failed authentication process occurred, which could trigger a mitigation action.

Figure 3:
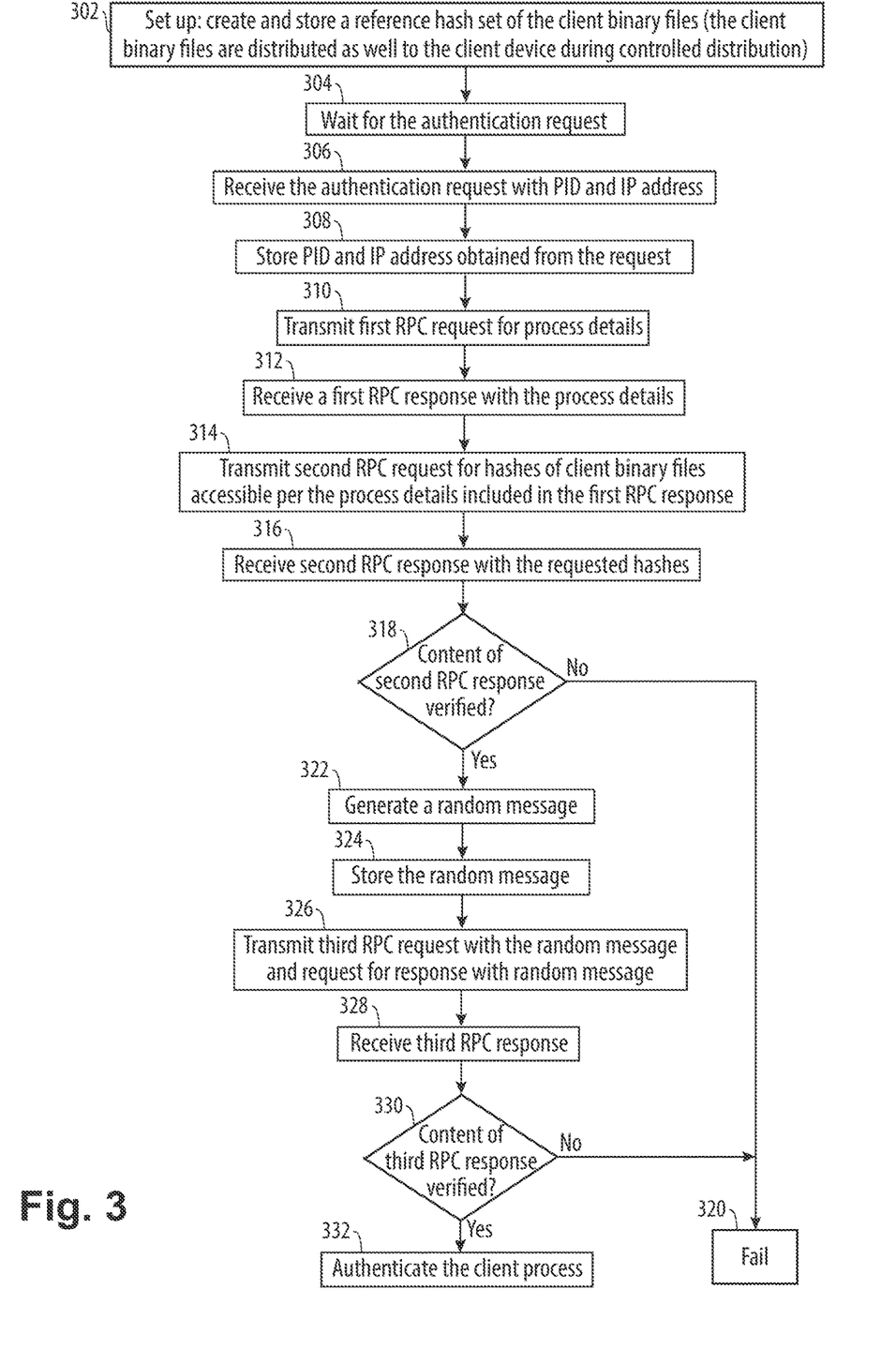
FIG. 3 illustrates a flowchart showing an example method performed by a layer of the server system shown in FIG. 1, in accordance with an aspect of the disclosure.
Figure 4:
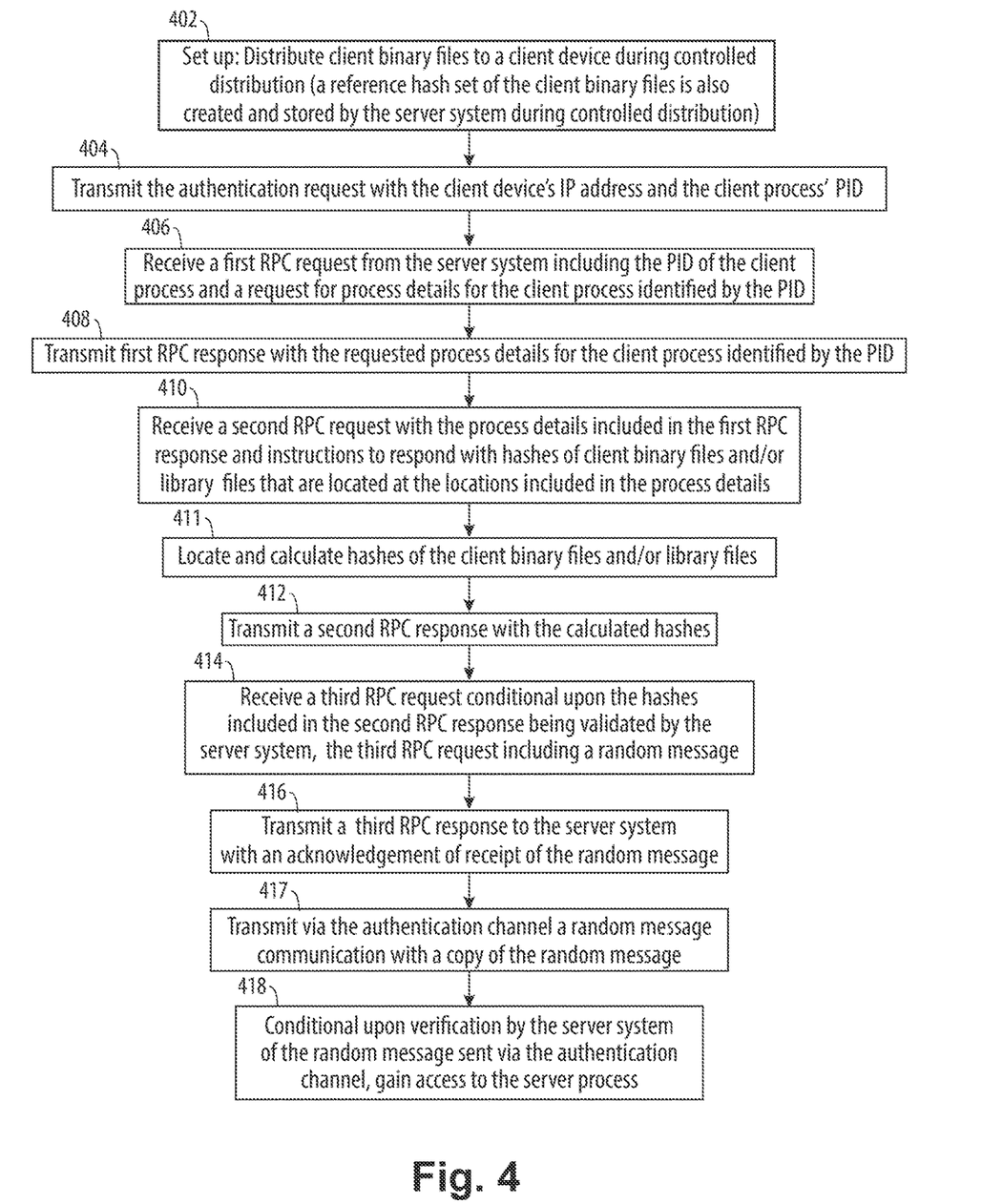
FIG. 4 illustrates a flowchart showing an example method performed by a layer of the client device shown in FIG. 1, in accordance with an aspect of the disclosure.

FIGS. 3 and 4 show exemplary and non-limiting flowcharts illustrating a method for authenticating a client process for accessing a server process, in accordance with certain illustrated embodiments. The example method can be performed by a client device or a server system that can be remote from one another, such as server system 102 and client device 104 shown in FIGS. 1, 2A, and 2B. Before turning to the description of FIGS. 3 and 4, it is noted that the flowcharts in FIGS. 3 and 4 show examples in which operational blocks are carried out in a particular order, as indicated by the lines connecting the blocks, but the various blocks shown in these flowcharts can be performed in a different order, or in a different combination or sub-combination. It should be appreciated that in some embodiments some of the blocks described below may be combined into a single block. In some embodiments, one or more additional blocks may be included. In some embodiments, one or more of the blocks can be omitted.

With reference to FIG. 3, an example method is shown of authenticating a client process (such as client process 120A, shown in FIG. 2A) executed by a client device (such client device 104A, shown in FIG. 2A), to access a server process (such as server process 110, shown in FIG. 2A) that is executed by a server system (such as server system 102, shown in FIGS. 2A and 2B). The method of authenticating can be performed, for example, by a SAL (such as SAL 112, shown in FIGS. 2A and 2B) executed by the server system and an operating system (OS) (such as server OS 116, shown in FIG. 2A).

At block 302, before the authentication process commences, there is a setup phase which includes, installing server binary files on the server device and the client binary files on the client device. While installing server binary files, it also installs the reference hash set on the server system and made accessible to the SAL.

After the setup phase, server system can accept the authentication request at any time. At block 304, the server system is thus ready and waiting to receive the authentication request from a client process at any time via an authentication channel. At block 306, an authentication request (which corresponds to transmission 201 in FIGS. 2A and 2B) is received via the authentication channel from the client process that requests authentication of the client process for authorization to access the server process.

The authentication request can identify the server process that is requested to be accessed and can further include a process identifier (PID) of the client process and an internet protocol (IP) address of the client device hosting the client process. The PID was assigned by an operating system of the client device (such as client OS 126, shown in FIG. 2A) and identifies the client process. A new PID is assigned for each instance of starting the client process and loading its binary files. The combination of IP address of client device and the PID uniquely identify the client process.

At block 308, the PID is stored in association with the client device's IP address in a storage device accessible to the SAL, such as a local storage device (such as SD 114, shown in FIG. 2A) for later reference.

At block 310, a first RPC request (which corresponds to transmission 203 in FIGS. 2A and 2B) is transmitted from the server system (e.g., via the server OS) to the client device (e.g., via the client OS). The first RPC request requests process details for the client process identified by the PID. The first RPC request is sent to the IP address of the client device 104.

Each time an RPC request is transmitted, an RPC transmit process can be performed, for example by the SAL in cooperation with the operating system of the server system (such as server OS 116, shown in FIG. 2), such as by using a server-side RPC handler. The SAL provides the content for the RPC request and the OS transmits the RPC request. The RPC request includes the PID of the client process that sent the authentication request (which was temporarily stored at block 308) and requests the process details for the client process having the PID. The process details can include a location of the client binary files.

At block 312, a first RPC response (which corresponds to transmission 205 in FIGS. 2A and 2B) is received by the server OS from the client OS, wherein the first RPC response is a response to the first RPC request. The first RPC response includes the process details for the client process as requested. Each time an RPC response is received, an RPC response process can be performed, for example by the SAL in cooperation with the server OS. The server OS receives the first RPC response, and the SAL extracts the content.

At block 314, a second RPC request (which corresponds to transmission 207 in FIGS. 2A and 2B) is transmitted to the client OS, instructing the client OS to calculate and respond with hashes of binary files accessible per the process details included in the first RPC response.

At block 316, a second RPC response (which corresponds to transmission 209 in FIG. 2) is received from the client OS, wherein the second RPC response is a response to the second RPC request. The second RPC response includes the hashes that were requested by the second RPC request and calculated by the client OS in response to the second RPC request.

It is noted that the client process 120 is not consulted until blocks 326 and 328, since the client process 120 could not be previously trusted. Until block 326, the method is performed without consulting the client process 120.

At determination block 318, a hash verification determination is made by comparing the one or more hashes received with the second RPC response with reference hash set predefined and stored in the server system.

If the determination at block 318 is NO, meaning the hash verification failed because the hash set received from client device does not match the reference hash set, then the authentication fails at block 320. This completes the first phase of authenticating the client process.

If the determination at block 318 is YES, meaning hash verification was successful of the hash set received in the second RPC response, the method continues at block 322. The second phase of authenticating the client process begins at block 322.

At block 322, a random message is generated and stored in correlation with identification of the client device (e.g., the IP address of the client device) and identification of the client process (e.g., the PID of the client process). Generation and storage of the random message can be performed by the SAL or a process accessible to the SAL. The random message can be a string of characters, for example, that are generated by an algorithm that generates random messages. At block 324, the random message is stored, e.g., in storage device 114. The random number is generated and stored internal to SAL 112. In this way, the random number is not generated or stored externally or transported from a remote location, reducing the possibility of access to the random number from a malicious entity.

At block 326, a third RPC request (which corresponds to transmission 211 in FIGS. 2A and 2B) is transmitted to the client OS. The third RPC request includes the random message and the client process's PID (which was earlier stored at block 308) and instructs the client OS to post this random message to the client process having the PID included in the third RPC request. The client OS identifies the client process using the PID.

At block 328, a third RPC response (which corresponds to transmission 213 in FIGS. 2A and 2B) is received from the client OS. At block 329, the SAL receives a random message in a communication sent by the client process via the authentication channel. The third RPC response and the random message via the authentication channel can be received substantially at the same time or close enough in time to be correlated by the SAL. The SAL correlates the third RPC response and the random message received via the authentication channel based on timing of the third RPC response relative to the receipt of the random message via the authentication channel. For example, the SAL can wait a predetermined amount of time after receiving the authentication request from the client process (e.g., as identified based on a combination of the IP address of the client device and the PID of the client process) to receive the random message from the same client process via the authentication channel.

At determination block 330, a determination is made whether the random message received by the server (e.g., the SAL) over the authentication channel matches the random message generated by the SAL and stored in correlation with identification of the client device. The determination at block 330 compares data exchanged via two different channels, meaning the authentication channel (between the client process and the SAL) and RPC communication between the client OS and the server OS. Security of random message is fortified by using two different channels for verifying the random message.

If the determination at block 330 is NO, meaning the random message received by the server (e.g., the SAL) over the authentication channel does not match the random message that was sent with the third RPC request, then the authentication fails at block 320. If the determination at block 330 is YES, meaning verification of the random message was successful, the method continues at block 332. At block 332, the client process is authenticated and allowed to access the server process.

With reference to FIG. 4, the example method illustrated in FIG. 3 is shown from the perspective of the client device. The method is performed by the client process hosted by the client device and a client OS (such as client process 120, client device 104, RPC handler 122, and client OS 126, shown in FIGS. 1 and 2A). At block 402, before the authentication process commences, during a setup phase, the client binary files are installed. It is noted, that also during the installation, a reference hash set is stored internally to the server system (e.g., in storage device 114, which is internal to SAL 112). Then the client process starts and starts executing its binary files.

At block 404, an authentication request is transmitted via an authentication channel from the client process to the server system, wherein the client process requests authentication for authorization to access the server process. The authentication request includes the PID of the client process and the IP address of the client device.

At block 406, a first RPC request is received from the server system (e.g., via the server OS). The first RPC request requests process details for the client process identified by the PID included in the authentication request. The client OS receives the first RPC request, and fetches process details for the client process identified by the PID included in the first RPC request.

At block 408, a first RPC response is transmitted to the server OS, wherein the first RPC response is a response to the first RPC request. The first RPC response includes the fetched process details, namely the client process identified by the PID included in the first RPC request.

At block 410, a second RPC request is received from the SAL in cooperation with the server OS with instructions for the client OS to calculate and respond with hashes of the client binary files that are configured to be loaded by the client process and are located at the locations included in the process details.

At block 411, the client binary files are located using the process details in the second RPC request. Hashes of the client binary files are calculated by the client device's RPC handler in cooperation with the client OS.

At block 412, a second RPC response is transmitted to the server OS, wherein the second RPC response is a response to the second RPC request. The second RPC response includes the hashes that were calculated as requested by the second RPC request.

At determination block 414, conditional upon the hashes included in the second RPC response being validated by the SAL of the server system, a third RPC request sent by the server system is received. The third RPC request includes a random message that was generated by the server system using a randomization algorithm.

At block 416, a third RPC response that includes the acknowledgement of receipt of the random message received in the third RPC request is transmitted to the SAL in cooperation with the server OS. The SAL verifies this acknowledgement and then waits for the copy of the random message to be received on the authentication channel.

At block 417, a random message communication that includes a copy of the random message received in the third RPC request is sent to the SAL by the client process system via the authentication channel. For purposes of correlating the random message communication by the server system with the client device, without limitation to a specific correlation technique, the random message communication can be sent within a predetermined time window. In another example the random message communication sent via the authentication channel can be sent within a predetermined time window relative to receipt of the third RPC request.

At block 418, conditional upon verification by the server system of the copy of the random message sent in the random message communication, the client process is authenticated by the server system and allowed to access the server process. This verification can include verification of the third RPC response's acknowledgement of receipt of the random message.

With returned reference to FIG. 1 and continued reference to FIG. 3, effectiveness for authenticating a client process is illustrated in two scenarios involving attempts to gain access to a server process 110 by malicious client process 130. In the first scenario, malicious client process 130 attempts to access the server process by sending an authentication request to server process 110 using the malicious client process's own PID. In response to receiving the authentication request, server OS 116 transmits a first RPC request to request process details using the client process's PID. Client OS 126 of client device 104C may respond to the first RPC request with a first RPC response having process details.

Next, server OS 116 of server system 102 sends a second RPC request to client OS 126 associated with malicious client process 130, wherein the second RPC request includes a request for hashes of binary files accessible per the process details provided by the first RPC response. As the malicious client process 130 uses non-genuine or malicious binary files the hash of the client process's binary files would not match the reference hashes stored on server system 102.

Once the verification determination performed at block 318 fails, the client device is not authenticated and the authentication request is rejected. Accordingly, the malicious client process 130 is denied access.

In the second scenario, malicious client process 130 attempts to access server process 110 by sending an authentication request to server process 110 using the PID of a legitimate client process, (such as client process 120B) and the IP address of a legitimate client device 104. The combination of IP address and the process ID uniquely identifies a legitimate client process. In this scenario, following exchange between server OS 116 and client OS 126 of client device 104C of the first and second RPC requests and responses, blocks 302-318 can be performed successfully, since the server system 102 will be authenticating a legitimate client process up till this point. In particular, the verification determination performed at block 318 can be successful.

However, when server process 110 generates and transmits a random message, with a third RPC request at blocks 322, 324, 326, respectively, the random message is sent to the legitimate client process identified by the IP address and PID in the authentication request. Accordingly, the malicious client process 130 never receives the random message and hence cannot present the copy of the random message on the authentication channel, causing the authentication process to fail and denial access by the malicious client process 130 to server process 110. Rather, the legitimate client process receives the unexpected random message, which is a red flag that a security breach was attempted by a malicious client process. The legitimate client can react by ignoring the third RPC request or reporting (e.g., to an internal monitor 220 or external monitor 222) the receipt of an unexpected random message as an indication of the malicious activity.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of server system 102 and client device 104 may be implemented or executed by one or more computer systems. For example, server system 102 or client device 104 can be implemented as device A1 501 using a computer system such as example computer system 500 illustrated in FIG. 5. In various embodiments, computer system 500 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

Computer system 500 may be described in the general context of computer system-executable instructions, such as program modules, being executed by a computer system. Generally, program modules may include routines, programs, objects, components, logic, data structures, and so on that perform particular tasks or implement particular abstract data types. Computer system 500 may be practiced in distributed data processing environments where tasks are performed by remote processing devices that are linked through a communications network. In a distributed data processing environment, program modules may be located in both local and remote computer system storage media including memory storage devices.

Figure 5:
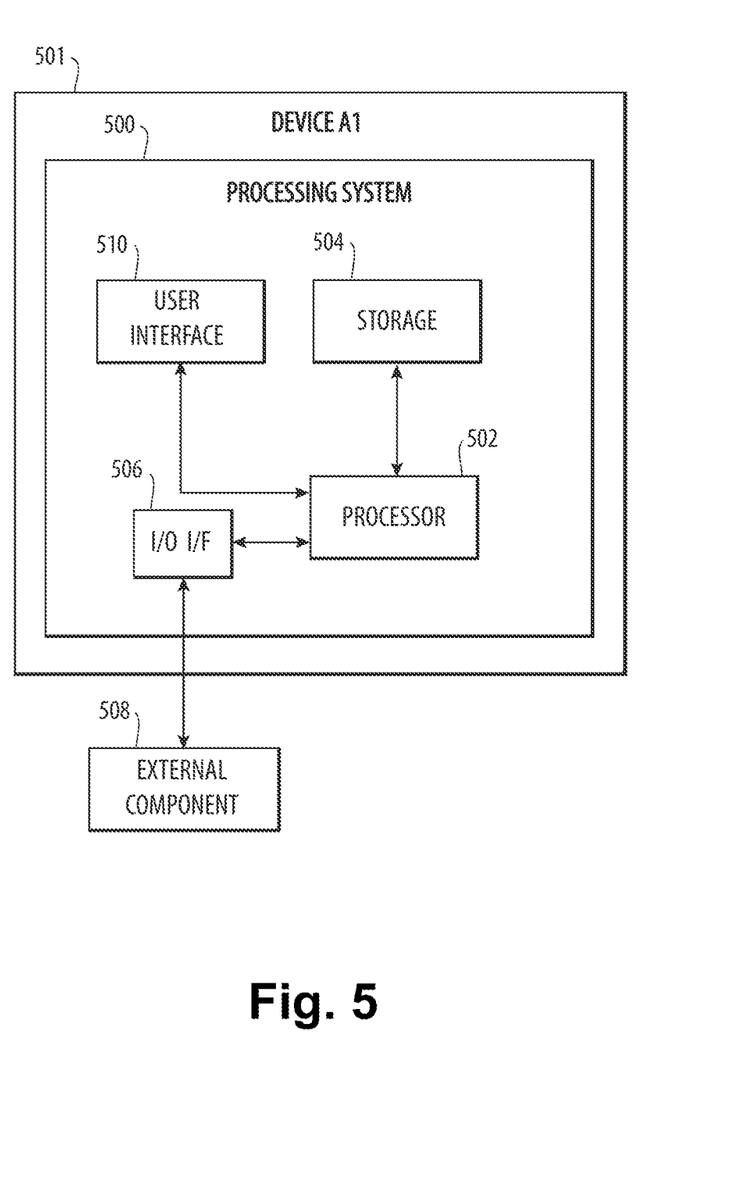
FIG. 5 illustrates an example computing system that could be used to implement a network monitor of a network protection system.

Computer system 500 is shown in FIG. 5 in the form of a general-purpose computing device. The components of computer system 500 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 500 typically includes a variety of computer system readable media. Such media may be any available media that is accessible by computer system 500, and it includes both volatile and non-volatile media, removable and non-removable media.

System memory 528 can include computer system readable media in the form of volatile memory, such as random access memory (RAM) 530 and/or cache memory 532. Computer system 500 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 518 by one or more data media interfaces. Memory 528 may include at least one program product having a set (e.g., at least one) of program modules that are configured to carry out the functions of embodiments of the disclosure.

Program/utility 540, having a set (at least one) of program modules 515, such as computer system 500, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the disclosure as described herein.

Computer system 500 may also communicate with one or more external devices 514 such as a keyboard, a pointing device, a display 524, etc.; one or more devices that enable a user to interact with computer system 500; and/or any devices (e.g., network card, modem, etc.) that enable device A1 501 to communicate with one or more other computing devices. Such communication can occur via Input/Output (I/O) interfaces 522. Still yet, computer system 500 can communicate with one or more networks such as a local area network (LAN), a general wide area network (WAN), and/or a public network (e.g., the Internet) via network adapter 520. As depicted, network adapter 520 communicates with the other components of device A1 501 via bus 518. It should be understood that although not shown, other hardware and/or software components could be used in conjunction with computer system 500. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A method of authenticating a client process to access a server process, the method comprising:

storing internally a reference hash set, the reference hash set including hashes of genuine client binary files and accessible from a time of installation of the server process, wherein the client binary files include executable files for execution of the client process and/or library files loaded by the executable files, wherein authentication occurs without relying on information stored at any external location;

receiving authentication request for authentication of the client process in an authentication session to authorize the client process to access a server resource provided by the server process;

in a first phase of the authentication session:

requesting from the client device (a) process details for accessing the client binary files loaded by the client process and (b) calculated hashes of these client binary files;

verifying, using the reference hash set, the calculated hashes received from the client device in response to the requesting, by comparing the reference hash set to the calculated hashes;

in a second phase of the authentication session:

contingent on positive verification in the first phase, transmitting a random message that is dynamically generated for the authentication session to the client process;

verifying a copy of the random message received back from the client process has been correctly processed and returned without tampering; and contingent on positive verification in the second phase, allowing the client process to access the requested server resource.

2. The method of claim 1, wherein the authentication request, communications exchanged during the first phase, and communications exchanged during the second phase are transmitted using first and second different channels.

3. The method of claim 2, wherein:

the authentication request includes a process identifier (PID) of the client process and internet protocol (IP) address of a client device hosting the client process is sent by the first channel via a network connection, wherein the PID is assigned by an operating system of the client device, and the communications exchanged in the first phase are transmitted by the second channel using remote procedure call (RPC) communication.

4. The method of claim 3, wherein the communications exchanged in the first phase include:

transmission of a first RPC request to the client device, the first RPC request requesting the process details for the client process identified by the PID, and receipt of a first RPC response in response to the first RPC request from the client device, the first RPC response including the process details for the client process identified by the PID.

5. The method of claim 4, wherein:

the process details include locations of the respective client binary files loaded by the client process, and the communications exchanged in the first phase further include:

transmission of a second RPC request to the client device, the second RPC request including one or more of the locations included in the process details that were retrieved from the first RPC response and instructing the client device to respond with calculated hashes of one or more client binary files accessible at these locations, and receipt of a second RPC response in response to the second RPC request from the client device, the second RPC response including the calculated hashes that were requested.

6. The method of claim 4, wherein:

transmitting in the second phase comprises transmitting by the second channel a third RPC request to the client process, using the IP address of client device and the PID of the client process, wherein the third RPC request includes the random message as generated by a randomization algorithm, and the second phase further comprises:
 storing the random message; and
 receiving, via the authentication channel, a copy of the random message from the client process, wherein verifying the copy of the random message in the second phase includes matching it against the stored random message.

7. The method of claim 6, wherein the received copy of the random message is encoded, wherein the method further comprises decoding the same before the verifying in the second phase.

8. A method of authenticating a client process to access a server process, the method comprising:
 submitting an authentication request for authentication of the client process in an authentication session to authorize the client process to access a server resource provided by the server process;
 in a first phase of the authentication session:
  receiving by a client device hosting the client process first requests from a server system hosting the server process for (a) client process details for accessing client binary files of the client process and (b) calculated hashes of the client binary files, wherein the client binary files include executable files for execution of the client process and/or library files loaded by the client process;
  providing by the client device the process details and the calculated hashes of the client binary files as per the process details in response to the first requests; and
  verifying, using a reference hash set, the calculated hashes received from the client device in response to the requesting, by comparing the reference hash set to the calculated hashes, the reference hash set including hashes of genuine client binary files and accessible from a time of installation of the server process, wherein authentication occurs without relying on information stored at any external location;
 in a second phase of the authentication session:
  contingent on positive verification by the server system of the calculated hashes provided in the first phase, receiving by the client device a second request from the server system, wherein the second request includes a random message that is dynamically generated for the authentication session; and
  responding by the client process to the second request with a copy of the random message received has been correctly processed and returned without tampering and contingent on positive verification by the server system of the copy of the random message, gaining access by the client process to the requested server resource.

9. The method of claim 8, wherein the authentication request and communications exchanged during the first and second phase are transmitted using first and second different channels.

10. The method of claim 9, wherein:
 the authentication request includes a process identifier (PID) of the client process and the IP address of the client device, and the authentication request is sent by the first channel via a network connection, wherein the PID is assigned by an operating system of the client device, and the communications exchanged in the first phase are transmitted by the second channel using remote procedure call (RPC) communication.

11. The method of claim 10, wherein the communications exchanged in the first phase include:
 receipt of a first RPC request from the server system, the first RPC request requesting the process details for the client process identified by the PID, and
 transmission of a first RPC response in response to the first RPC request, the first RPC response including the process details for the client process identified by the PID.

12. The method of claim 10, wherein the process details include locations of the respective client binary files loaded by the client process, and the communications exchanged in the first phase further include:
 receipt of a second RPC request from the system server, the second RPC request including one or more of the locations included in the process details that were provided in the first RPC response and instructing the client device to respond with calculated hashes of one or more the client binary files located at these locations, and
 transmission to the server system of a second RPC response in response to the second RPC request, the second RPC response including the calculated hashes that were requested, wherein the method further comprises:
  locating the client binary files using the one or more locations included in the second RPC request; and
  calculating the hashes of the located client binary files, wherein positive verification of the calculated hashes includes verification of the calculated hashes relative to a reference hash set previously stored by the server system.

13. The method of claim 10, wherein:
 receiving the second request in the second phase comprises receiving by the second channel from the system server a third RPC request that includes the random message and the PID,
 responding to the second request in the second phase further comprises transmitting to the server system via the authentication channel, by the client process identified by the PID included in the third RPC request, the copy of the random message included in the third RPC request, and
 positive verification of the copy of the random message includes verification by the server system that content of the received copy of the random message matches the random message that was included in the third RPC request.

14. The method of claim 13, further comprising encoding content of the RPC response.

15. A computer system hosting a server process for authenticating a client process to access the server process, the computer system comprising:
 a memory configured to store instructions;
 at least one processor disposed in communication with said memory, wherein the at least one processor, upon execution of the instructions is caused to:
  store internally a reference hash set, the reference hash set including hashes of client binary files and accessible from a time of installation of the server process, wherein the client binary files include executable files for execution of the client process and/or library files loaded by the executable files, wherein authentication occurs without relying on information stored at any external location;

receive an authentication request for authentication of the client process in an authentication session to authorize the client process to access a server resource provided by the server process;

in a first phase of the authentication session:
  request from the client device, client process details for accessing the client binary files loaded by the client process and calculated hashes of these client binary files;
  verify, using the reference hash set, the calculated hashes received from the client device in response to the requesting, by comparing the reference hash set to the calculated hashes;

in a second phase of the authentication session:
  contingent on positive verification in the first phase, transmit a random message that is dynamically generated for the authentication session to the client process;
  verify the copy of the random message received back from the client process has been correctly processed and returned without tampering; and
  contingent on positive verification in the second phase, allow the client process to access the requested server resource.

16. The computer system of claim 15, wherein:
the authentication request includes a process identifier (PID) of the client process and is sent by a first channel via a network connection with an internet protocol (IP) address of a client device hosting the client process, wherein the PID is assigned by an operating system of the client device, and
wherein the communications exchanged in the first phase are transmitted by a second channel that is different than the first channel using remote procedure call (RPC) communication.

17. The computer system of claim 16, wherein the communications exchanged in the first phase include:
transmission of a first RPC request to the client device, the first RPC request requesting the process details for the client process identified by the PID, wherein the process details include locations of the respective client binary files configured to be loaded for execution of the client process, and
receipt of a first RPC response in response to the first RPC request from the client device, the first RPC response including the process details for the client process identified by the PID;
transmission of a second RPC request to the client device, the second RPC request including one or more of the locations included in the process details that were retrieved from the first RPC response and instructing the client device to respond with calculated hashes of the client binary files accessible at the one or more locations, and
receipt of a second RPC response in response to the second RPC request from the client device, the second RPC response including the calculated hashes that were requested.

18. The computer system of claim 17, wherein:
transmitting in the second phase comprises transmitting by the second channel a third RPC request to the client process, using the IP address of client device and the PID of the client process, wherein the third RPC request includes the random message as generated by a randomization algorithm, and the second phase further comprises:
  storing the random message; and
  receiving, via the authentication channel, a copy of the random message;
  wherein verifying a copy of the random message in the second phase includes matching the same against the stored random message.

19. A computer system hosting a client process that seeks authentication for accessing a server process, the computer system comprising:
a memory configured to store instructions;
at least one processor disposed in communication with said memory, wherein the at least one processor, upon execution of the instructions is caused to:
submit an authentication request for authentication of the client process in an authentication session to authorize the client process to access a server resource provided by the server process;

in a first phase of the authentication session:
  receive by a client device hosting the client process first requests from a server system hosting the server process for (a) process details for accessing client binary files of the client process and (b) calculated hashes of the client binary files, wherein the client binary files include executable files for execution of the client process and/or library files loaded by the executable files;
  provide by the client device the process details and the calculated hashes of the client binary files as per the process details in response to the first requests; and
  verify, using a reference hash set, the calculated hashes received from the client device in response to the requesting, by comparing the reference hash set to the calculated hashes, the reference hash set including hashes of genuine client binary files and accessible from a time of installation of the server process, wherein authentication occurs without relying on information stored at any external location;

in a second phase of the authentication session:
  contingent on positive verification by the server system of the calculated hashes provided in the first phase, receive by the client device a second request from the server system, wherein the second request includes a random message that is dynamically generated for the authentication session; and
  respond by the client process to the second request with a copy of the random message received has been correctly processed and returned without tampering; and
  contingent on positive verification by the server system of the copy of the random message, gain access by the client process to the requested server resource.

20. The computer system of claim 19, wherein:
the authentication request includes a process identifier (PID) of the client process and the IP address of the client device, and the authentication request is sent by a first channel via a network connection, wherein the PID is assigned by an operating system of the client device, and
the communications exchanged in the first phase are transmitted by a second channel that is different than the first channel using remote procedure call (RPC) communication.

21. The computer system of claim 20, wherein the communications exchanged in the first phase include:
receipt of a first RPC request from the server system, the first RPC request requesting the process details for the client process identified by the PID, wherein the process details include locations of the respective client binary files configured to be loaded by the client process for execution of the client process, transmission of a first RPC response in response to the first RPC request, the first RPC response including the process details for the client process identified by the PID, receipt of a second RPC request from the system server, the second RPC request including one or more of the locations included in the process details that were provided in the first RPC response and instructing the client device to respond with calculated hashes of the client binary files accessible at the one or more locations, and transmission to the server system a second RPC response in response to the second RPC request, the second RPC response including the calculated hashes that were requested, wherein the at least one processor upon execution of the instructions is further caused to:

locate the client binary files using the one or more locations included in the second RPC request;

calculate the hashes of the located client binary files, and wherein positive verification of the calculated hashes includes verification of the calculated hashes relative to a reference hash set previously stored by the server system.

22. The computer system of claim 21, wherein:

receiving the second request in the second phase comprises receiving by the second channel from the system server a third RPC request that includes the random message and the PID, responding to the second request in the second phase further comprises transmitting to the server system via the authentication channel, by the client process identified by the PID included in the third RPC request, the copy of the random message included in the third RPC request, and positive verification of the copy of the random message includes verification by the server system that content of the received copy of the random message matches the random message that was included in the third RPC request.

* * * * *